Patented June 27, 1939

2,163,594

UNITED STATES PATENT OFFICE 2,163,594

PROCESS FOR THE PRODUCTION OF AMINO ACIDS

William H. Engels, Rahway, and Gustav A. Stein, Elizabeth, N. J., assignors to Merck & Co. Inc., Rahway, N. J., a corporation of New Jersey No Drawing. Application December 1, 1936, Serial No. 113,608

4 Claims. (Cl. 260—534)

This invention relates to a valuable improvement in the manufacture of amino carboxylic acids by ammonolysis of appropriately selected halogenated organic acids, in the presence of an ammonium halide.

In the old art, these amino carboxylic acids have been produced by reacting upon halogenated organic acids with a large excess of ammonia.

We have now found that such amino carboxylic acids of the type of glycocoll, alanine, etc. may be obtained in much higher yield than heretofore, and that the excess of ammonia required in the old process may be greatly reduced, if the ammonolysis of the appropriately selected halogenated organic acids is carried out in the presence of an ammonium halide, such as ammonium chloride.

In order to illustrate our new process in detail, the following specific example is given:

Example

About 320 lbs. of ammonium chloride are suspended in about 110 liters of water and heated to about 95° C. At this temperature, about 225 lbs. of concentrated ammonia and a solution of about 94.5 lbs. of chlor acetic acid in 100 lbs. of water are added simultaneously, under stirring, at such a rate that about 15 to 30 minutes are required. The mixture is stirred and maintained at 95° for about 1½ hours. The mixture is cooled and the ammonium chloride removed by filtration. The filtrate is concentrated in vacuo to about 65 liters. After cooling, ammonium chloride is again filtered off, and aminoacetic acid is precipitated by adding about 270 liters of methyl alcohol under stirring. After standing for about 8 hours, the precipitate is filtered, washed with a small amount of 80% methyl alcohol, and then with some 99% methyl alcohol. By treating the second precipitate of ammonium chloride with a little water, filtering, and adding alcohol, about 10% more crude aminoacetic acid is obtained.

When dried, the total amount of crude aminoacetic acid obtained amounts to about 47 lbs.

This crude acid is dissolved in about 50 liters of water, under heating. After treating the solution with charcoal and filtering, about 180 liters of methyl alcohol are added. After standing for several hours, the mixture is filtered, washed first with a small amount of 80% alcohol, then with 99% alcohol, and dried. The yield of pure aminoacetic acid thus obtained is 42 lbs. The product has a melting point of about 226° C., and is free from ammonia when tested with Nessler's reagent.

By evaporating the mother liquors to dryness and treating with a small amount of water, 3 to 4 lbs. more of pure aminoacetic acid can be obtained.

The total yield of 44 to 45 lbs. is equal to 59–60% of theory.

From the foregoing detailed example, it will be evident to those skilled in the art that the reaction therein described may be adapted, also, to the production of other similar amino carboxylic acids by appropriate selection of the halogenated organic acid and suitable adjustment of the other working conditions. Thus, it will be readily understood, that if chlor-propionic acid is substituted for the chloracetic acid exemplified, and the other factors of the reaction and purification processes properly adjusted, pure alanine will be obtained in substantial quantity.

Therefore, the present invention is not to be limited to the specific detailed illustration given, but may be modified, as indicated, without departing from its spirit and scope.

We claim as our invention:

1. A process for the production of amino carboxylic acids which comprises ammonolysis of an appropriately selected halogenated organic acid in the presence of an ammonium halide, the said halide being retained in the reaction mixture throughout the entire reaction.

2. A process for the production of amino carboxylic acids which comprises ammonolysis of an appropriately selected chlorinated organic acid in the continuous presence of ammonium chloride.

3. A process for the production of amino acetic acid which comprises ammonolysis of chloracetic acid in the continuous presence of ammonium chloride.

4. A process for the production of amino-propionic acid which comprises ammonolysis of chlor-propionic acid, in the continuous presence of ammonium chloride.

WILLIAM H. ENGELS.
GUSTAV A. STEIN.